(12) United States Patent
Dworatzek et al.

(10) Patent No.: US 7,784,836 B2
(45) Date of Patent: Aug. 31, 2010

(54) AIR FILTER CONNECTING UNIT

(75) Inventors: Klemens Dworatzek, Edingen (DE); Ralf Bauder, Ketsch (DE)

(73) Assignee: Mann & Hummel GmbH, Ludwigsburg (DE)

( * ) Notice: Subject to any disclaimer, the term of this patent is extended or adjusted under 35 U.S.C. 154(b) by 632 days.

(21) Appl. No.: 11/723,160

(22) Filed: Mar. 16, 2007

(65) Prior Publication Data

US 2007/0222218 A1    Sep. 27, 2007

(30) Foreign Application Priority Data

Mar. 16, 2006    (DE) .................. 10 2006 012 590

(51) Int. Cl.
*F16L 27/00* (2006.01)

(52) U.S. Cl. .................. 285/272; 285/305; 285/921

(58) Field of Classification Search .................. 285/34, 285/36, 40, 305, 391, 396, 921, 272

See application file for complete search history.

(56) References Cited

U.S. PATENT DOCUMENTS

| 7,318 | A | * | 4/1850 | Brown ...................... 285/396 |
| 1,477,440 | A | * | 12/1923 | Grier, Jr. ...................... 285/34 |
| 2,327,714 | A | * | 8/1943 | Iftiger, Sr. ...................... 285/35 |
| 5,649,723 | A | * | 7/1997 | Larsson ...................... 285/34 |
| 5,882,367 | A |   | 3/1999 | Morgan et al. |

* cited by examiner

*Primary Examiner*—Aaron Dunwoody
*Assistant Examiner*—Fannie Kee

(57) ABSTRACT

An air filter connecting unit having a connecting flange (11) and a connecting nipple (20) that can be coupled to the connecting flange via a snap connection. The connecting flange (11) has a round receptacle (13) provided with an inside thread flight (12) that is subdivided into individual, resilient, curved thread flight segments (12.1, 12.2, . . . , 12.*n*). The associated connecting nipple (20) has a generally cylindrical construction and an advancing thread (22) which ends in a free-running groove (23) on the connecting nipple.

15 Claims, 3 Drawing Sheets

AIR FILTER CONNECTING UNIT

BACKGROUND OF THE INVENTION

This invention relates to an air filter connecting unit having a connecting flange and a connecting nipple which can be connected to the flange by a snap connection.

Air filter connecting units serve to connect an air filter housing with an air conduit element, e.g., a hose, that conveys the filtered air further. The air conduit element is usually pushed onto a connecting nipple on the air filter housing. Especially when the air conduit element contains predetermined bends or the connecting nipple is designed to be angled, it may be necessary to provide rotatability of the connecting nipple with respect to the connecting flange in order to be able to push the air conduit element into place in a first angular position and then be able to position it in the engine space by rotating the connecting nipple so that it is situated in the area intended for it. Rotatability is also helpful in dissipating any torsional stresses that might arise.

With an air filter connecting unit known from U.S. Pat. No. 5,882,367, a snap connection is provided, allowing the connecting nipple to rotate with respect to the flange after the connecting nipple has been inserted into the receiving recess in the flange. The snap connection comprises an obliquely angled shoulder on the flange which is resiliently deformed due to a thickened area on the connecting nipple and springs back behind the thickened area, so that the connection is established.

The strength of such a snap connection depends on the height and holding angle of the undercut. Since the joining forces depend on the joining angle and also on the undercut, this yields a mutual dependence. In manual assembly, the joining forces are limited, in particular in the case of an unfavorable installation position in a tight engine space, and therefore the holding forces that can be achieved are also limited.

SUMMARY OF THE INVENTION

It is an object of the present invention to provide an improved air filter connecting unit for connecting an air filter housing to an air conduit.

Another object of the invention is to provide an air filter connecting unit comprising connecting flange and a connecting nipple that can be conveniently and reliably coupled together via a snap connection.

A further object of the invention is to provide an air filter connecting unit with a snap connection in which the ratio of the possible holding force to the required joining force in increased.

These and other objects are achieved in accordance with the present invention by providing an air filter connecting unit comprising a connecting flange and a connecting nipple that can be coupled to the flange via a snap connection, wherein the connecting flange comprises a circular receptacle with at least one inside thread flight that is subdivided into individual, resilient, curved thread flight segments, and the connecting nipple has a cylindrical construction and carries at least one advancing thread that ends in a free-running groove on the connecting nipple.

In accordance with a further aspect of the invention, the objects are achieved by providing an air filter connecting unit comprising a connecting flange and a connecting nipple that can be coupled to the flange by a snap connection, wherein the connecting flange comprises a circular receptacle having at least one inside advancing thread flight which ends in a free-running groove on the connecting flange, and the connecting nipple has a cylindrical construction and carries at least one outside thread flight which is subdivided into individual, resilient, curved thread flight segments.

The invention thus relates to an air filter connecting, unit having a connecting flange and a connecting nipple that can be coupled thereto via a snap connection, in which the connecting flange has a round receiving recess having at least one inside thread flight that is subdivided into individual resilient curved thread flight segments and in which the connecting nipple has a cylindrical construction and caries at least one advancing thread which ends in a free-running groove on the connecting nipple.

Another approach is embodied by an air filter connecting unit in which resilient external thread flight segments are provided on the connecting nipple and an advancing thread is provided on the inside of the connecting flange.

Due to the advancing thread provided according to this invention, an assembler need exert only comparatively little force when inserting the connecting nipple in order to be able to screw the connecting nipple into the flange regardless of whether the advancing thread is profiled as a trapezoidal or sawtooth thread. At the same time, high forces can be achieved in the axial direction. This is further facilitated by the fact that at the usual air conduit diameter and the conventional pitch of the advancing thread, long circumferential lengths result, and thus long distances must be traveled in the thread to achieve a relatively minor axial advance. By segmentation of at least one thread flight, which is arranged on the connecting flange according to a first preferred embodiment, but also conversely may be arranged on the connecting nipple, it is possible for the spread open resilient threaded segments to spring back when the connecting nipple has reached its predetermined end position in the flange. The segments of the thread flight then engage one after another in the circumferential free-running groove. If all the threaded segments are engaged there, they cannot retreat back into the advancing thread again even when the direction of rotation of the connecting nipple is reversed. The threaded segments thus achieve free movement and can be freely rotated without any change in axial end position. Accordingly, the connecting nipple is rotatable within the free-running groove but is also axially secured.

Due to the reduced joining forces, an ergonomic improvement is achieved. Due to the resiliently deformable, outwardly spreadable threaded segments, high tensile stresses on the circumference such, as those that occur with traditional snap connections, are also avoided.

An additional collar may be provided behind the free-running groove, so that an axial fixed stop is formed behind the groove, thus preventing the threaded segments from sliding onto additional circumferential areas of the connecting nipple.

The connecting nipple can optionally be better secured against unscrewing by the fact that an additional annular shoulder is provided between the end of the advancing thread and the free-running groove, the height of this shoulder being greater than the height of the thread flights. The shoulder may also be formed by a partial area of the last thread flight of the advancing thread itself, which is formed with a more angled profile.

To facilitate screwing the connecting nipple into the flange, it is advantageous to design the advancing thread to be conical. Thus, there may still be some play at the beginning of the connection which facilitates screwing the threaded segments into the advancing thread. After all the threaded segments have been bent elastically in such a manner that they are guided into the thread flights of the advancing thread, the overall diameter of the thread continues to increase gradually until there is only a very slight play between the advancing thread and the threaded segments. The connecting nipple must then be turned further with force until the first threaded segments engage in the free-running groove, and therefore further rotation of the threaded segments which are tightly guided in the thread flights is made easier again.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1A:
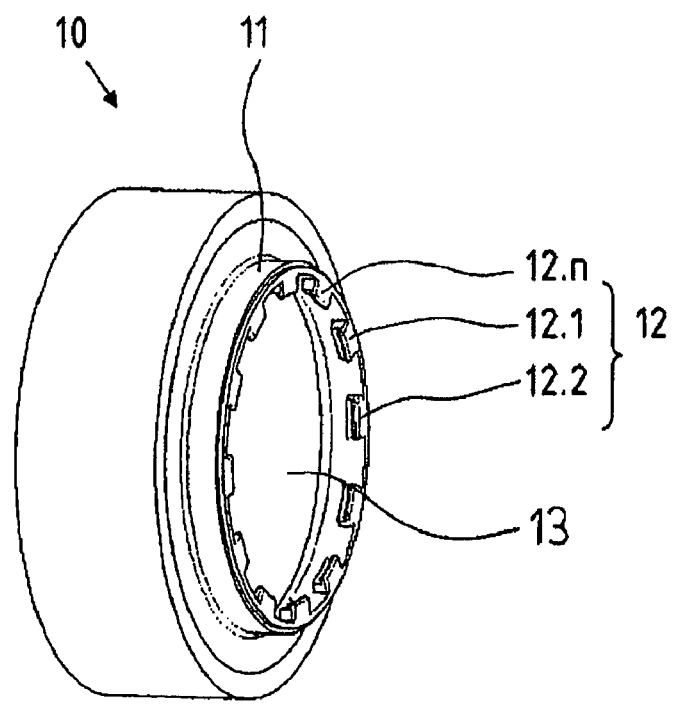
FIG. 1a is a perspective view of a receiving flange according to the present invention.

FIG. 1a shows a connecting flange 11 which here is part of a cylindrical element 10 which may in turn be part of an air filter housing. A plurality of threaded segments or inside advancing thread flights 12.1, 12.2, ..., 12.n protrude radially inwardly from the connecting flange 11 into the interior of the flange and into a circular receptacle or recess 13. The threaded segments 12.1, 12.2, ..., 12.n together form an inside thread 12.

Figure 1B:
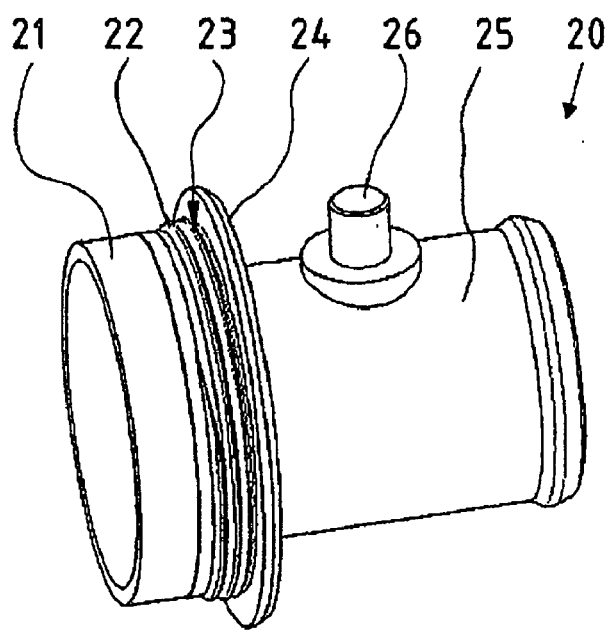
FIG. 1b is a perspective view of a connecting nipple in accordance with the present invention.

FIG. 1b shows a connecting nipple 20 that is compatible with connecting flange 11 of FIG. 1a. Connecting nipple 20 has a cylindrical shoulder 21 on which an external resilient threaded flight segment 22 is provided. Behind the thread 22 there is a circumferential free-running groove 23, bounded by a collar 24.

For the actual connection to a more extensive air conduit element, a connection section 25 is provided on connecting nipple 20. In the illustrated embodiment, an optional lateral branch 26 is included to provide a connection for a maintenance switch.

Figure 2:
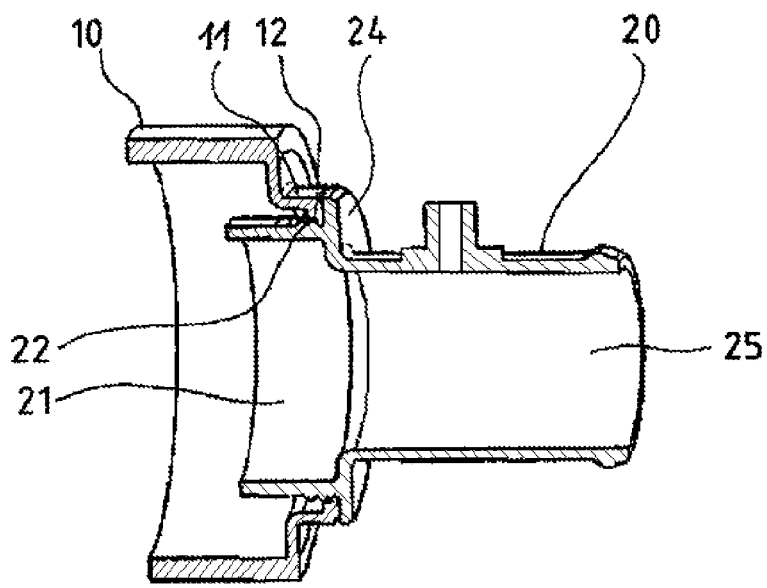
FIG. 2 is a sectional view of an assembled air filter connecting unit according to the invention.

FIG. 2 shows the assembled air filter connecting unit comprised of the connecting flange 11 and the connecting nipple 20. The connecting nipple 20 here lies with its collar 24 in tight axial contact with the flange 11. The threaded segments 12 have traversed the outside thread 22 on the cylindrical section 21 and are situated in the free-running groove 23 such that the connecting nipple 20 is axially locked in position but is still freely rotatable relative to the connecting flange 11.

Figure 3:
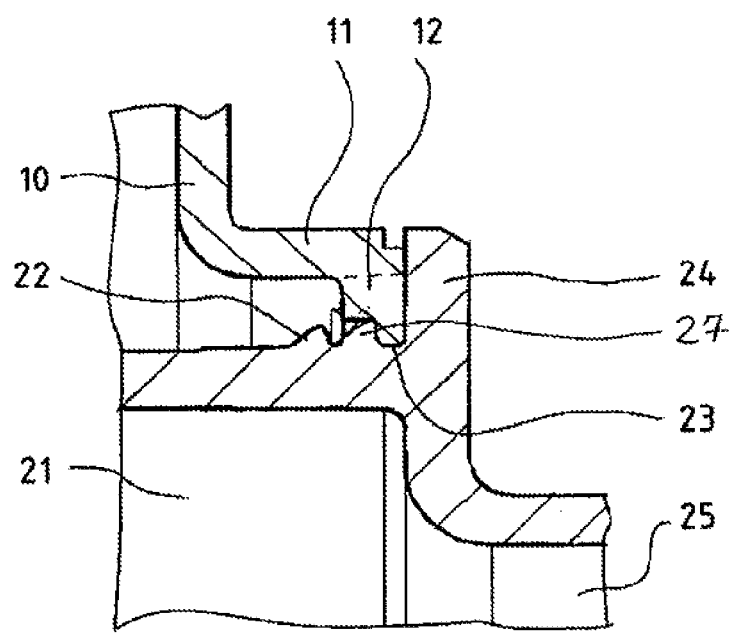
FIG. 3 is a detail of the sectional view of FIG. 2.

FIG. 3 shows again in enlarged detail the arrangement of the assembled air filter connecting unit. An additional annular shoulder or rib 27 is provided on the cylindrical section 21 behind the outside thread 22 over which the resilient threaded segments 12 must be moved during assembly in order to enable them to resiliently spring back into the free-running groove 23. Rib 27 thereby serves to further secure the connecting nipple 20 in the connection flange 11.

Alternatively, the shoulder 27 may also be formed by the last thread flight of the outside thread 22. However, the cross-sectional shape is then designed to be more angular, so a precisely fitting, interlocking connection substantially free of any play is established by the cooperation of the threaded segments 12, the collar 24, the shoulder 27 and the free-running groove 23.

Figure 4:
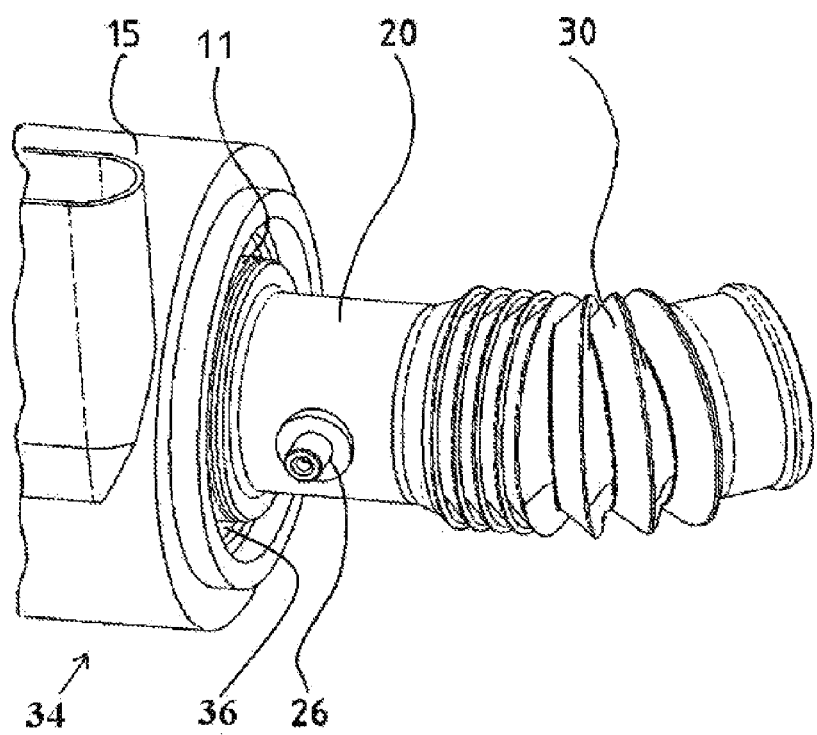
FIG. 4 is a perspective view of a completed air filter in accordance with the invention.

FIG. 4 shows a possible application, an air filter assembly 34, in which the connecting flange 11 is integrated into an end wall 36 of a cylindrical air filter housing 15. Due to the inventive design, the connecting nipple 20 can be installed easily by screwing it in. After assembly, rotatability is maintained, so that the position of a branch 26 for a maintenance switch, for example, can be corrected subsequently and adapted to the given conditions in the engine compartment. A hose 30, constructed as a corrugated tube, is attached to the connecting nipple 20 and leads to other component assemblies such as an internal combustion engine.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air filter connecting unit comprising:
   a connecting flange and
   a connecting nipple coupled to the flange via a snap connection, wherein the connecting flange comprises a circular receptacle with at least one inside thread flight that is subdivided into individual, resilient, curved thread flight segments which extend radially inwardly from the circular receptacle, and
   wherein the connecting nipple has a cylindrical construction and carries at least one advancing thread extending radially outwardly from the connecting nipple that ends in a free-running groove on the connecting nipple, and
   wherein said inside thread flights on said connecting flange, once engaged into said free-running groove, are operative to axially secure said connecting nipple within said connecting flange while permitting said connecting nipple to be freely rotated within said connecting flange.

2. A connecting unit according to claim 1, wherein the free-running groove on the connecting nipple is terminated by a collar which has an outside diameter larger than an inside diameter of the inside thread flight on the connecting flange.

3. A connecting unit according to claim 1, wherein the free-running groove on the connecting nipple is terminated by a collar which has an outside diameter larger than a diameter of the circular receptacle of the connecting flange from which the resilient thread segments extend radially inwardly.

4. A connecting unit according to claim 1, wherein the resilient thread flight segments are distributed around an entire circumference of the connecting flange.

5. A connecting unit according to claim 1, wherein an annular shoulder is provided on the connecting nipple between the free-running groove and the advancing thread, said shoulder having a height greater than the thread flights of the advancing thread.

6. A connecting unit according to claim 1, wherein the advancing thread is a conical thread.

7. An air filter assembly comprising
   an air filter housing connected to an air conduit by an air filter connecting unit according to claim 1,
   wherein the connecting flange is integrated into a wall of the air filter housing, and
   the air conduit is connected to the connecting nipple.

8. An air filter connecting unit comprising:
a connecting flange and
a connecting nipple coupled to the flange by a snap connection,
wherein the connecting flange comprises
a circular receptacle having at least one inside advancing thread flight extending radially inwardly from the circular receptacle, and
wherein the connecting nipple comprises
a cylindrical construction and carries at least one outside thread flight extending radially outwardly from the connecting nipple which is subdivided into individual, resilient, curved thread flight segments,
a radially projecting collar formed on said connecting nipple,
a circumferential free-running groove positioned between said outside thread flight and said collar, said collar forming one wall of said free-running groove,
wherein said outside thread flight and said inside thread flight are sized and configured to threadably engage, and
wherein said inside thread flights on said connecting flange, once engaged into said free-running groove, are operative to axially secure said connecting nipple within said connecting flange while permitting said connecting nipple to be freely rotated within said connecting flange.

9. A connecting unit according to claim 8, wherein the free-running groove is terminated by the collar which has an inside diameter smaller than the inside diameter of the advancing thread flight.

10. A connecting unit according to claim 8, wherein the free-running groove is terminated by the collar which has an inside diameter smaller than the outside diameter of the resilient thread flight segments.

11. A connecting unit according to claim 8, wherein the free-running groove is terminated by the collar which has an inside diameter smaller than an outside diameter of an annular segment of the connecting nipple from which the resilient thread segments extend radially outwardly.

12. A connecting unit according to claim 8, wherein the resilient thread flight segments are distributed around an entire circumference of the cylindrical connecting nipple.

13. A connecting unit according to claim 8, wherein
an annular shoulder is provided on the connecting nipple between the free-running groove and the advancing thread, and
wherein said shoulder has a height greater than the thread flights of the outside thread.

14. A connecting unit according to claim 8, wherein the advancing thread is a conical thread.

15. An air filter assembly comprising
an air filter housing connected to an air conduit by an air filter connecting unit according to claim 8,
wherein the connecting flange is integrated into a wall of the air filter housing, and
the air conduit is connected to the connecting nipple.

* * * * *